United States Patent [19]

Furukawa

[11] Patent Number: 5,373,451

[45] Date of Patent: Dec. 13, 1994

[54] RACK TRANSPORT CONTROL APPARATUS FOR A MANUFACTURING LINE

[75] Inventor: Satomi Furukawa, Kawasaki, Japan

[73] Assignee: Fujitsu Limited, Kawasaki, Japan

[21] Appl. No.: 31,852

[22] Filed: Mar. 16, 1993

[30] Foreign Application Priority Data

Mar. 17, 1992 [JP] Japan ................................ 4-058720

[51] Int. Cl.$^5$ ............................................ G06F 15/46
[52] U.S. Cl. ..................................... 364/478; 364/468
[58] Field of Search ................................ 364/468, 478

[56] References Cited

U.S. PATENT DOCUMENTS

| | | | |
|---|---|---|---|
| 3,845,286 | 10/1974 | Aronstein et al. | 364/468 |
| 4,309,600 | 1/1982 | Perry et al. | 364/468 |
| 4,729,105 | 3/1988 | Thompson et al. | 364/478 |
| 5,229,948 | 7/1993 | Wei et al. | 364/468 |

*Primary Examiner*—Tan V. Mai
*Assistant Examiner*—Steven R. Gorland

*Attorney, Agent, or Firm*—Armstrong, Westerman, Hattori, McLeland & Naughton

[57] ABSTRACT

An apparatus is provided for controlling transport of racks in a manufacturing line which includes a series of processes and has buffers associated with the respective processes for temporarily keeping racks carrying semimanufactured articles to be transported to the respective processes. The apparatus includes a host computer having a memory and being in communication with the processes and with the buffers, and a carry-out request table stored in the memory for recording rack carry-out requests from the processes. The host computer includes request monitoring means for monitoring the carry-out request table. The request monitoring means operates in response to detection of a carry-out request to output a transport command to transport a rack corresponding to the carry-out request to a next process only when the number of racks kept in a buffer associated with a second next process of the rack is smaller than a predetermined value.

12 Claims, 12 Drawing Sheets

| PROCESS | EQUIPMENT | STATUS |
|---|---|---|
| PROCESS 10 | EQUIPMENT 11 | CARRY-IN REQUESTED |
| PROCESS 10 | EQUIPMENT 12 | — |
| PROCESS 20 | EQUIPMENT 21 | CARRY-IN REQUESTED |
| PROCESS 30 | EQUIPMENT 31 | CARRY-IN REQUESTED |
| PROCESS 30 | EQUIPMENT 32 | CARRY-IN REQUESTED |

2A

F I G. 8

| RACK ID | PROCESS FLOW |
|---|---|
| RACK 101 | PROCESS 10 → PROCESS 20 → PROCESS 30 |
| RACK 102 | PROCESS 10 → PROCESS 20 → PROCESS 30 |
| RACK 103 | PROCESS 10 → PROCESS 20 → PROCESS 30 |
| RACK 104 | PROCESS 10 → PROCESS 20 → PROCESS 30 |
| RACK 105 | PROCESS 10 → PROCESS 20 → PROCESS 30 |
| RACK 106 | PROCESS 20 → PROCESS 30 |
| RACK 107 | PROCESS 10 → PROCESS 20 → PROCESS 30 |
| RACK 108 | PROCESS 10 → PROCESS 20 → PROCESS 30 |
| RACK 109 | PROCESS 10 → PROCESS 30 |
| RACK 110 | PROCESS 10 → PROCESS 30 |
| RACK 111 | PROCESS 10 → PROCESS 20 |
| RACK 112 | PROCESS 10 → PROCESS 20 |

4A

F I G. 10

| PROCESS | RACK ID | CARRY-IN TIME |
|---|---|---|
| PROCESS 10 | RACK 110 | 10:05 |
| PROCESS 10 | RACK 111 | 10:10 |
| PROCESS 10 | RACK 112 | 10:25 |
| PROCESS 30 | RACK 101 | 10:30 |
| PROCESS 30 | RACK 102 | 10:35 |
| PROCESS 30 | RACK 103 | 10:36 |
| PROCESS 30 | RACK 104 | 10:38 |
| PROCESS 30 | RACK 105 | 10:40 |
| PROCESS 20 | RACK 106 | 10:45 |

5A

F I G. 11

| PROCESS | LIMIT NUMBER |
|---|---|
| PROCESS 10 | 5 |
| PROCESS 20 | 3 |
| PROCESS 30 | 5 |

7A

F I G. 12

RACK TRANSPORT CONTROL APPARATUS FOR A MANUFACTURING LINE

BACKGROUND OF THE INVENTION

1. Field of the Invention

The present invention relates to a rack transport control apparatus for manufacturing lines, and more particularly, to a rack transport control apparatus for a manufacturing line including a series of processes for producing a plurality of types of articles, which apparatus controls the flow of racks carrying semimanufactured articles to and from the individual processes.

2. Description of the Related Art

In recent years, manufacturing systems aided by a host computer have been applied to manufacturing lines for producing a plurality of types of articles in small quantities, and automated manufacturing Increased in flexibility and efficiency is under development.

An example of such manufacturing lines is illustrated in FIG. 1. This manufacturing line comprises a plurality of processes 10, 20 and 30, and a storage 100 for temporarily keeping articles half-finished by the processes. The storage 100 includes buffers associated with the respective processes 10, 20 and 30. The buffers are provided to reduce the stagnation of semimanufactured articles arising from the difference in time required by the respective processes, and are used to temporarily keep semimanufactured articles to be conveyed to the corresponding processes. Manufacturing equipments 11 and 12 are provided for the process 10, a manufacturing equipment 21 for time process 20, and manufacturing equipments 31 and 82 for the process 30.

In the manufacturing line constructed as above, a plurality of semimanufactured articles, such as printed wiring boards to which a large number of electronic parts are mounted, are contained in racks according to their kinds, and each rack Is conveyed by a transport vehicle 200 to the process to which the semimanufactured articles contained therein are to be directed. Semimanufactured articles are finished when they have passed through the required processes. Each rack comprises a box for containing a plurality of semimanufactured articles of the same kind.

In this type of manufacturing lines, a plurality of types of articles are concurrently manufactured; namely, different types of articles are passed through different processes, requiring different tasks and times in the individual processes. Thus, there is a possibility that a large number of semimanufactured articles may be contained in any of the buffers associated with time processes 10, 20 and 30. To prevent this, a time management method has been conventionally employed. Specifically, when introducing new semimanufactured articles into the inlet of the manufacturing line, the time period these articles would require up to the end of the final process is estimated by simulation on the basis of the kinds of the semifinished articles then involved in the line, the storage state, etc. The new articles are introduced into the line only when it is ascertained that the estimated time is within a predetermined time, thus administering the time required up to the final process.

However, managing only the total time required up to the final process is not enough and unable to cope with the limitation on time elapsed between specific processes of the manufacturing line. For example, in an SMT (surface mount technology) unit assembly line for mounting electronic parts to printed wiring boards, once solder paste is applied, soldering must be completed before the applied solder paste dries. Thus, there is a limitation on the wait time between the end of the solder paste application process and the start of the soldering process. Even though the total time required up to the final process is within the predetermined time, the wait time may be so long that the solder paste dries. In such cases, a large number of defective articles may result.

Further, even if the total time is estimated by simulation and it is ascertained that the estimated time is within the predetermined time, trouble may occur in any of the equipments 11 to 32 during actual processing after semimanufactured articles are introduced into the inlet of the manufacturing line. In such cases, the processes will not be carried out in the simulated manner, and there still is a possibility that a large number of semimanufactured articles may be contained in the buffers.

SUMMARY OF THE INVENTION

An object of the present invention is to provide a rack transport control apparatus for a manufacturing line which is able to restrict the number of semimanufactured articles stagnating between processes.

To achieve the above object, the present invention provides all apparatus for controlling transport of racks in a manufacturing line which includes a series of processes and has buffers associated with the respective processes for temporarily keeping racks carrying semimanufactured articles to be transported to the respective processes. The apparatus comprises a carry-out request table for recording rack carry-out requests from the processes, and request monitoring means for monitoring the carry-out request table, wherein the request monitoring means operates such that after detecting a carry-out request, the request monitoring means outputs a transport command to transport the rack corresponding to the carry-out request to the next process only when the number of racks kept in the buffer associated with the second next process of the rack is smaller than a predetermined value.

The present invention also provides an apparatus for controlling transport of racks in a manufacturing line which includes a series of processes and has buffers associated with the respective processes for temporarily keeping racks carrying semimanufactured articles to be transported to the respective processes. This apparatus comprises a carry-in request table for recording rack carry-in requests from the processes, and request monitoring means for monitoring the carry-in request table, wherein the request monitoring means operates such that after detecting a carry-in request, the request monitoring means selects a rack to be carried out of the buffer associated with the process from which the carry-in request has been output, and outputs a transport command to transport the selected rack to the process from which the carry-in request has been output only when the number of racks kept in the buffer associated with the process subsequent to the process from which the carry-in request has been output is smaller than a predetermined value.

The above and other objects, features and advantages of the present invention will become apparent from the following description when taken in conjunction with the accompanying drawings which illustrate a preferred

BRIEF DESCRIPTION OF THE DRAWINGS

FIG. 8 is a diagram showing an example of a carry-in request table;

FIG. 10 is a diagram showing an example of a rack process flow management table:

FIG. 11 is a diagram showing an example of an in-storage rack table; and

FIG. 12 is a diagram showing an example of a buffer condition management table.

DESCRIPTION OF THE PREFERRED EMBODIMENT

An embodiment of the present invention will be described with reference to the drawings.

Figure 1:
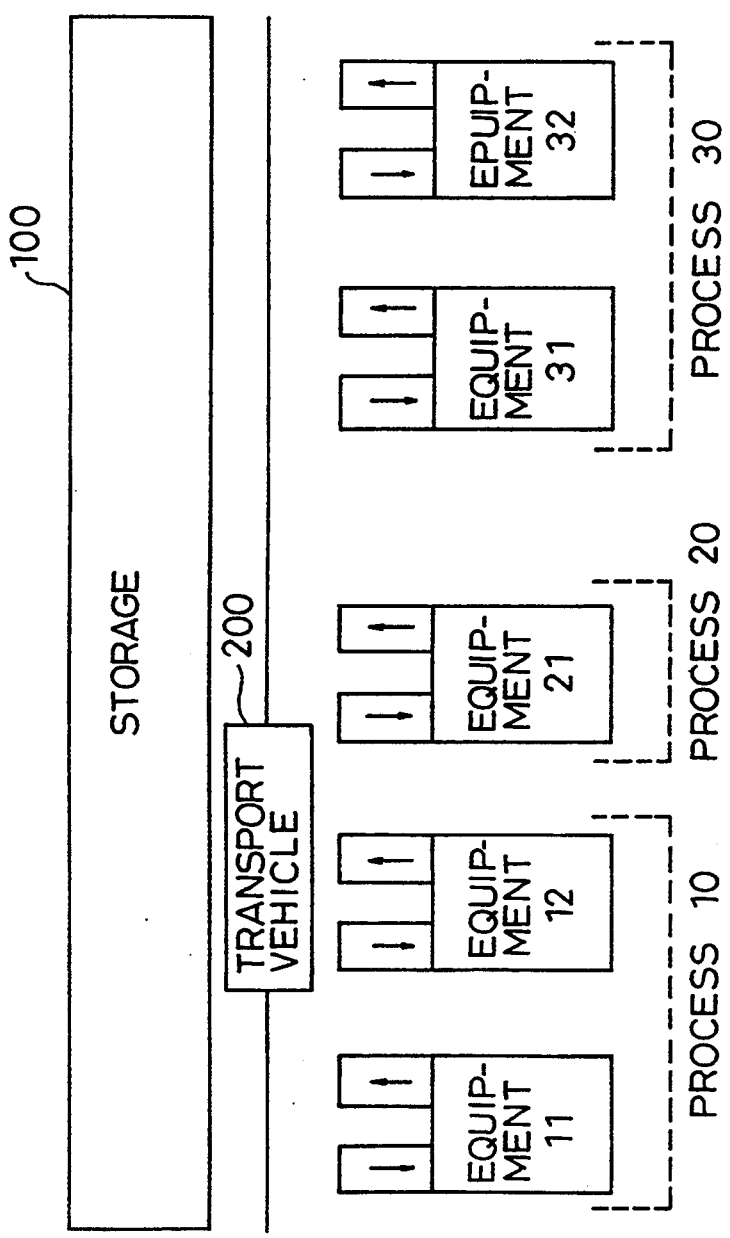
FIG. 1 is a diagram showing an example of a manufacturing line.
Figure 2:
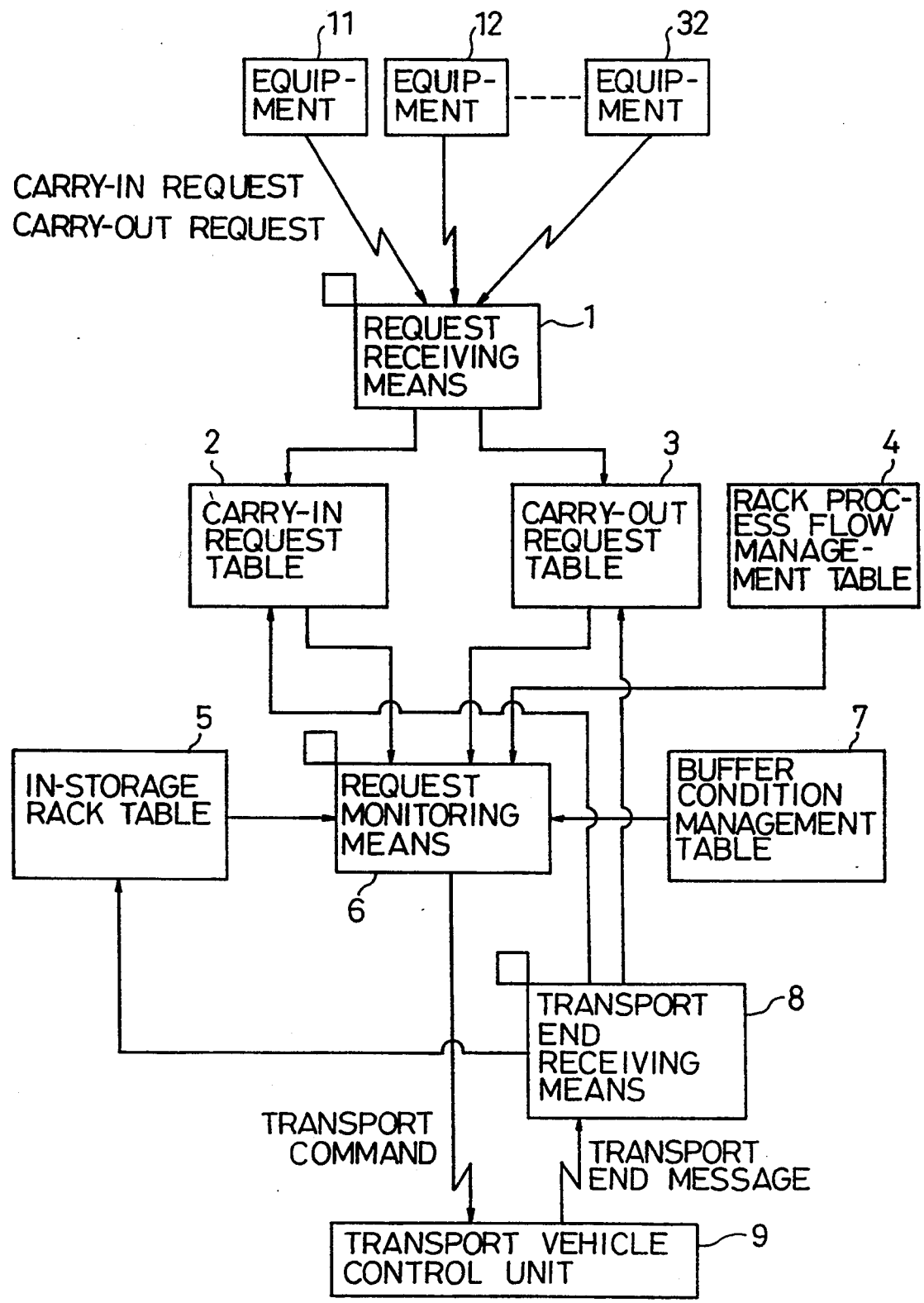
FIG. 2 is a block diagram showing a principal part of a rack transport control apparatus for manufacturing lines according to an embodiment of the present invention.

First, a principal part of a rack transport control apparatus for a manufacturing line, according to the embodiment of the present invention, will be described with reference to the block diagram of FIG. 2 showing various tables and various means. The arrangement of the manufacturing line is identical with that shown in FIG. 1. In FIG. 2, a carry-in request table 2 records rack carry-in requests supplied from equipments 11 to 32, and a carry-out request table 3 records rack carry-out requests supplied From the equipments 11 to 32. A rack process flow management table 4 is used to record and manage the process flows of individual racks. Each of the racks comprises a boxlike container which contains a plurality of semimanufactured articles of the same kind and which is conveyed by a transport vehicle.

An in-storage rack table 5 is used for managing the storage state of racks currently kept in the individual buffers of the storage, and a carry-in time at which each rack is carried into the storage is also recorded in the table 5. A buffer condition management table 7 is used for managing limit numbers, or upper limits, up to which racks can be kept in the respective buffers. The buffers are provided in the storage, corresponding to the respective processes, for keeping racks to be transported to the respective processes. Specific examples of the tables 2, 3, 4, 5 and 7 will be described in detail later.

Also provided are request receiving means 1, request monitoring means 6 and transport end receiving means 8, whereby transport control with respect to the racks and the transport vehicle is carried out in real time on the basis of carry-in and carry-out requests supplied from the equipments 11 to 32. The request receiving means 1, the request monitoring means 6 and the transport end receiving means 8 represent the control function achieved by a host computer (not shown) and a program for operating the computer, and the aforementioned various tables are stored in the memory of the host computer.

The request receiving means 1 receives carry-in and carry-out requests from the equipments 11 to 32 associated with the respective processes, and records the received requests in the carry-in and carry-out request tables 2 and 3. Details of this procedure will be explained with reference to FIG. 3.

Figure 3:
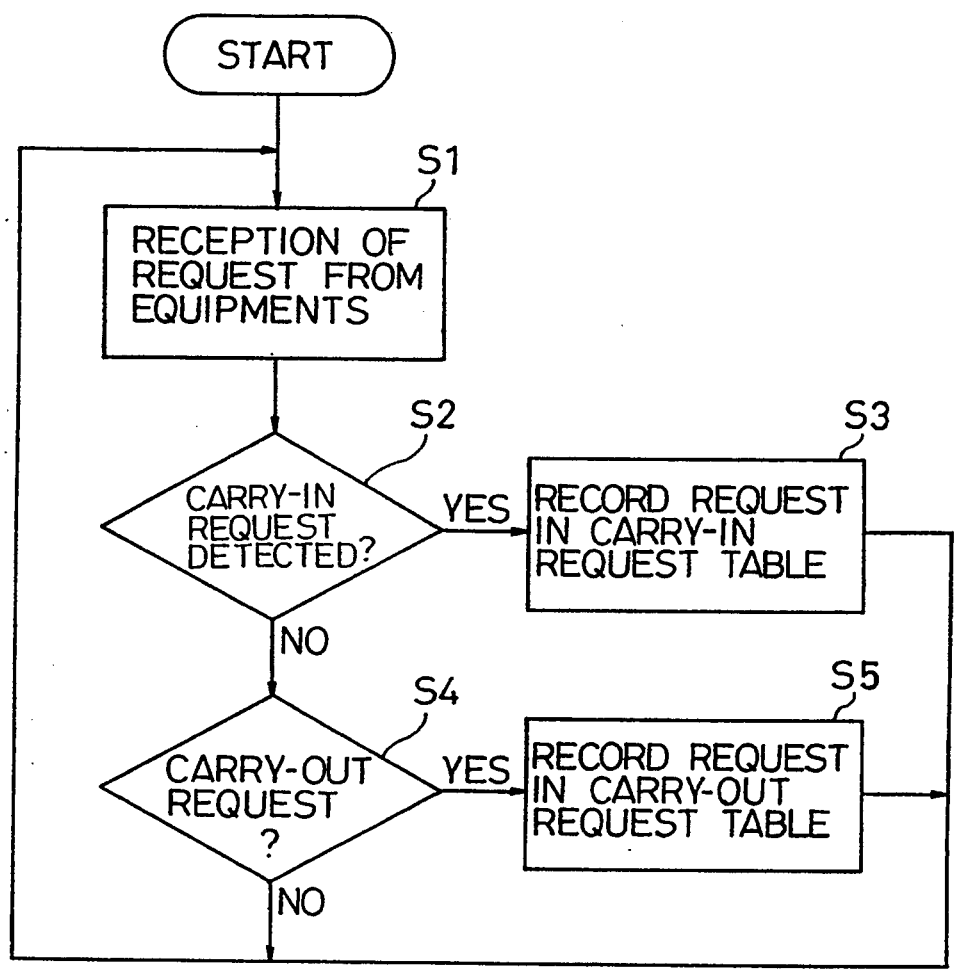
FIG. 3 is a flowchart showing a receiving and recording procedure executed by request receiving means.

FIG. 3 is a flowchart showing the receiving and recording procedure executed by the request receiving means 1. In the chart, the numbers following "S" represent step numbers.

[S1] Transmission of a carry-in and a carry-out request from the equipments 11 to 32 of the processes is monitored, and any such request is taken in when transmitted.

[S2] If the received request is a carry-in request, the program proceeds to Step S3, and if not, the program proceeds to Step S4.

[S3] Based on the received carry-in request, "CARRY-IN REQUESTED" is recorded in a field of the carry-in request table 2 corresponding to the process and the equipment requiring a rack.

[S4] If the received request is a carry-out request, the program proceeds to Step S5, and if not, the program returns to Step S1.

[S5] Based on the received carry-out request, "CARRY-OUT REQUESTED" is recorded in a field of the carry-out request table 3 corresponding to the process and the equipment requiring discharge of a rack, and also the name of the rack to be let out is recorded.

Referring again to FIG. 2, the request monitoring means 6 always monitors the carry-in and carry-out request tables 2 and 3, and outputs a rack transport command in accordance with the recorded requests. Details of this procedure will be explained with reference to FIGS. 4 and 5.

Figure 4:
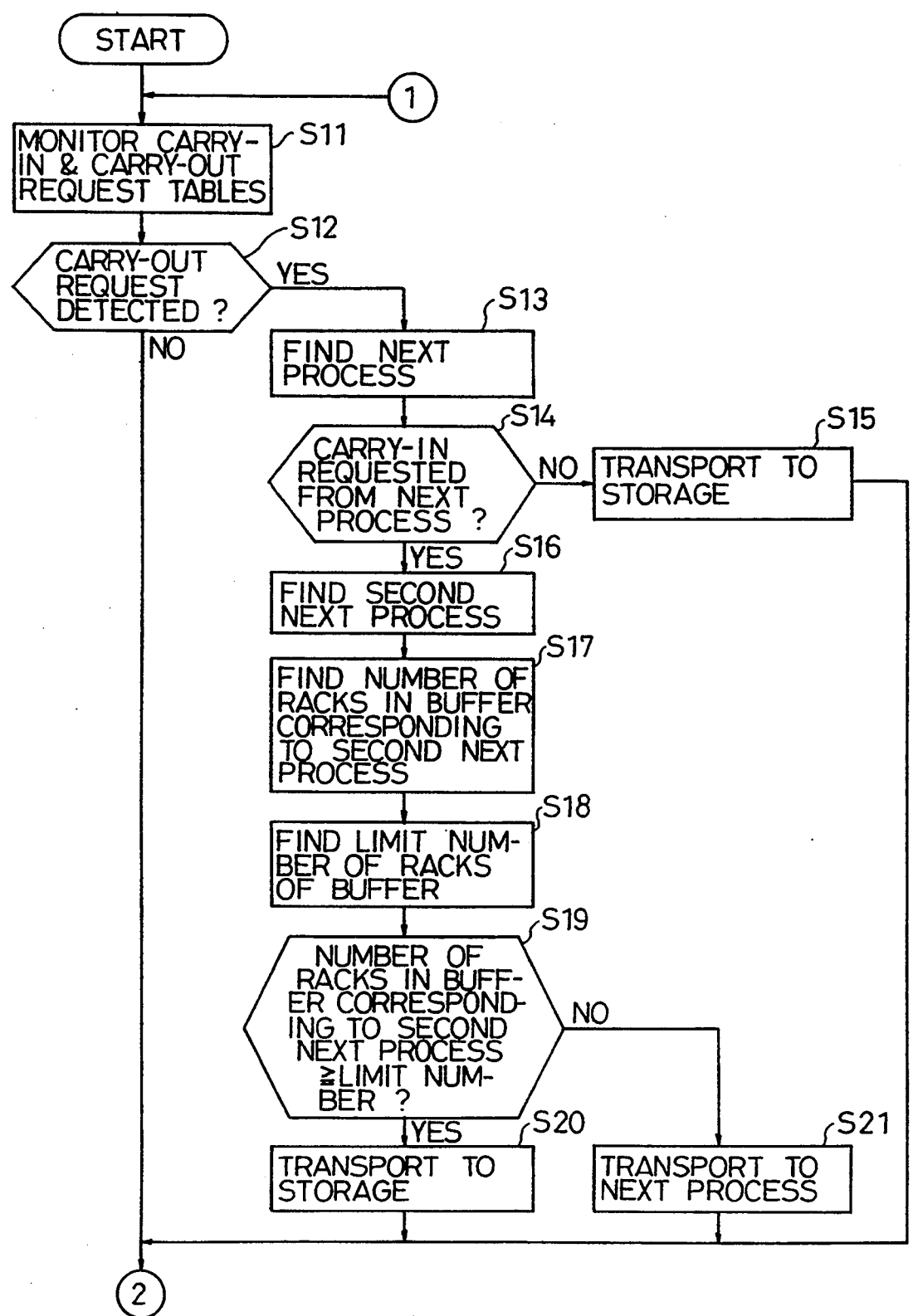
FIG. 4 is a flowchart showing a first half of a monitoring and command procedure executed by request monitoring means.
Figure 5:
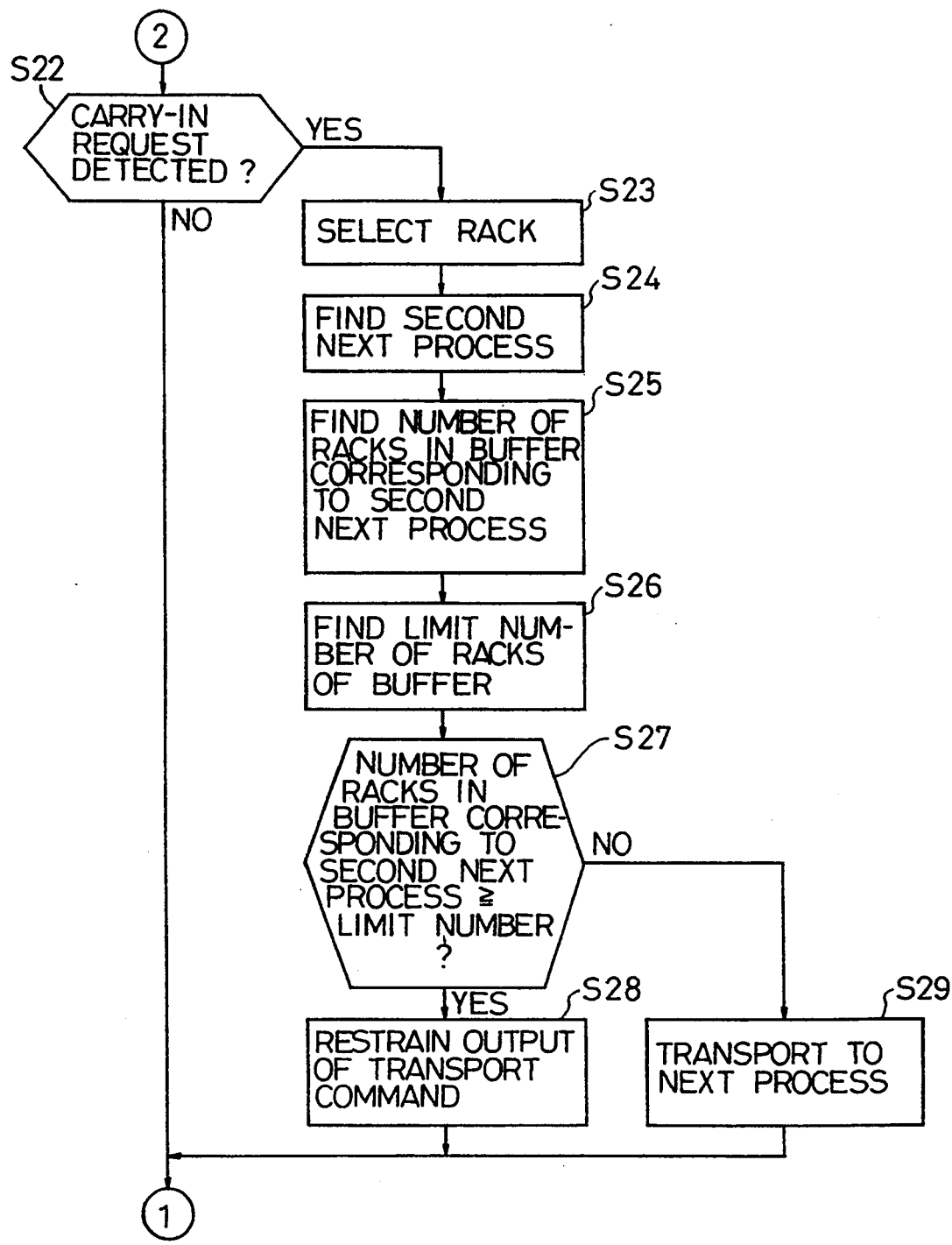
FIG. 5 is a flowchart showing the remaining part of the monitoring and command procedure executed by the request monitoring means.

The flowcharts of FIGS. 4 and 5 illustrate the monitoring and command procedure executed by the request monitoring means 6, wherein FIG. 4 shows the former part of the procedure and FIG. 5 shows the latter part of the same.

[S11] The carry-in and carry-out request tables 2 and 3 are monitored at all times.

[S12] If a carry-out request is detected, the program proceeds to Step S13, and if not, the program proceeds to Step S22.

[S13] The next process for the rack with respect to which the carry-out request has been issued is determined from the rack process flow management table 4.

[S14] Whether a carry in request has been received from the equipment belonging to the next process determined in Step S13 is determined from the carry-in request table 2. If no carry-in request has been received, the program proceeds to Step S15, and if a carry-In request has been received, the program proceeds to Step S16.

[S15] The rack with respect to which the carry-out request has been issued is not transported to the next process; instead, a storage transport command is supplied to a transport vehicle control unit 9 to temporarily keep the rack in the buffer of the storage corresponding to the next process.

[S16] The second next process (i.e., the process subsequent to the next process) for the rack with respect to which the carry-out request has been issued is determined from the rack process flow management table 4.

[S17] The number of racks presently kept in the buffer of the storage corresponding to the second next process determined in Step S16 is determined from the in-storage rack table 5.

[S18] The limit number, i.e., the upper limit, of racks that can be kept in the storage buffer corresponding to the second next process determined in Step S16 is determined from the buffer condition management table 7.

[S19] It is determined whether the number of the currently kept racks, obtained in Step S17, is a value greater than or equal to the limit number determined in Step S18. If the number of the presently kept racks is greater than or equal to the limit number, the program proceeds to Step S20; if the former is smaller than the latter, the program proceeds to Step S21.

[S20] The rack with respect to which the carry-out request has been issued is not transported to the next process; instead, a storage transport command is supplied to the transport vehicle control unit 9 to temporarily keep the rack in the storage buffer corresponding to the next process.

[S21] A process transport command is supplied to the transport vehicle control unit 9 to transport the rack, with respect to which the carry-out request has been issued, to the next process.

Thus, even in the case where a rack carry-out request is detected and at the same time a carry-in request is received from the process to which the rack in question is to be transported next, the rack is not immediately transported to the next process, but is transported thereto only when the number of the racks in the buffer corresponding to the second next process is smaller than the limit number. By suitably setting the individual limit numbers, it is possible to reduce the stagnation of semimanufactured articles between processes, and to appropriately cope with the limited time between specific processes.

[S22] If a carry-in request is detected, the program proceeds to Step S23, and if not, the program returns to Step S11.

[23] The in-storage rack table 5 is checked to specify a rack of which the carry-in time is the oldest among the racks kept in the storage buffer corresponding to the process from which the carry-in request has been received. The selected rack is the rack which is to be transported to the process from which the carry-in request has been received.

Although not illustrated in FIG. 5, where the program proceeds to Step S28 after executing Steps S23 and the subsequent Steps S24 to S27, if racks still exist in the storage buffer corresponding to the process from which the carry-in request has been received, the flow returns to Step S23, to select a rack off which the carry-in time is the second oldest.

[S24] The second next process for the rack selected in Step S23 is determined from the rack process flow management table 4. In this case, the process from which the carry-in request has been received is the "next process" for the rack, and the process subsequent thereto is the "second next process."

[S25] The number of the racks presently kept in the storage buffer corresponding to the second next process is determined from the in-storage rack table 5.

[S26] The limit number, or the upper limit, of racks that can be kept in the storage buffer corresponding to the second next process is determined from the buffer condition management table 7.

[S27] It is determined whether the number of the presently kept racks, obtained in Step S25, is a value greater than or equal to the limit number obtained in Step S26. If the number of the presently kept racks is greater than or equal to the limit number, the program proceeds to Step S28, and if the former is smaller than the latter, the program proceeds to Step S29.

[S28] The rack is not transported to the process from which the carry-in request has been received.

[S29] A process transport command is output to the transport vehicle control unit 9 to convey the selected rack from the storage buffer to the process (next process) from which the carry-in request has been received.

As in the case where a carry-out request is detected, even when a carry-in request is detected, a rack is not immediately transported to the process (next process) from which the carry-in request has been received, but is transported thereto only when the number of the racks in the buffer corresponding to the subsequent process (second next process) is smaller than the limit number. Also in this case, by suitably setting the limit numbers, it is possible to reduce the stagnation of semimanufactured articles between processes, and to appropriately cope with the limited time between specific processes.

Referring again to FIG. 2, the transport vehicle control unit 9 controls an unmanned transport vehicle for transporting racks, in accordance with the transport command from the request monitoring means 6, such that the vehicle travels between the storage and the individual processes. When carry-in or carry-out operation is completed, the control unit 9 outputs a transport end message to the transport end receiving means 8. On receiving the transport end message, the transport end receiving means 8 updates the tables. Details of the updating procedure will be explained with reference to FIG. 6.

Figure 6:
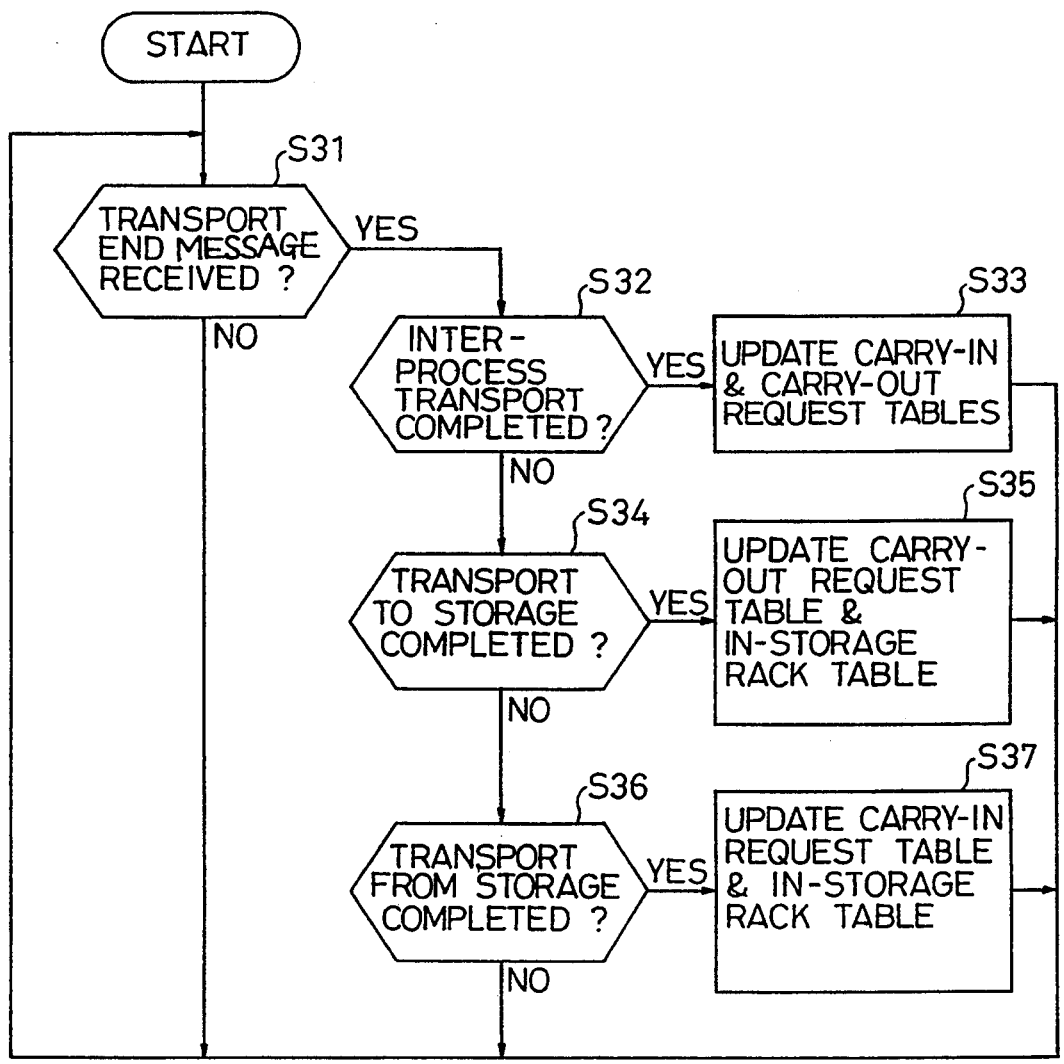
FIG. 6 is a flowchart showing a table updating procedure executed by transport end receiving means.

FIG. 6 is a flowchart showing the table updating procedure executed by the transport end receiving means 8.

[S31] Transmission of a transport end message from the transport vehicle control unit 9 is monitored, and the program proceeds to Step S32 when a transport end message is received.

[S32] If the transport end message indicates completion of a rack transport between processes, the program proceeds to Step S33, and if not, the program proceeds to Step S34.

[S33] The carry-in and carry-out tables 2 and 3 are updated to record a transport end state therein.

[S34] If the transport end message indicates completion of a rack transport from the process which has issued the carry-out request to the storage, the program proceeds to Step S35; if not, the program proceeds to Step S36.

[S35] The carry-out request table 3 is updated, and this rack is additionally recorded in the in-storage rack table 5.

[S36] If the transport end message indicates completion of a rack transport from the storage to the process which has issued the carry-in request, the program proceeds to Step S37, and if not, the program returns to Step S31.

[S37] The carry-in request table 2 is updated, and this rack is deleted from the in-storage rack table 5.

The principal part of the above-described rack transport control apparatus for manufacturing lines, according to the embodiment of the invention, will be explained in more detail with reference to a specific example.

Figure 7:
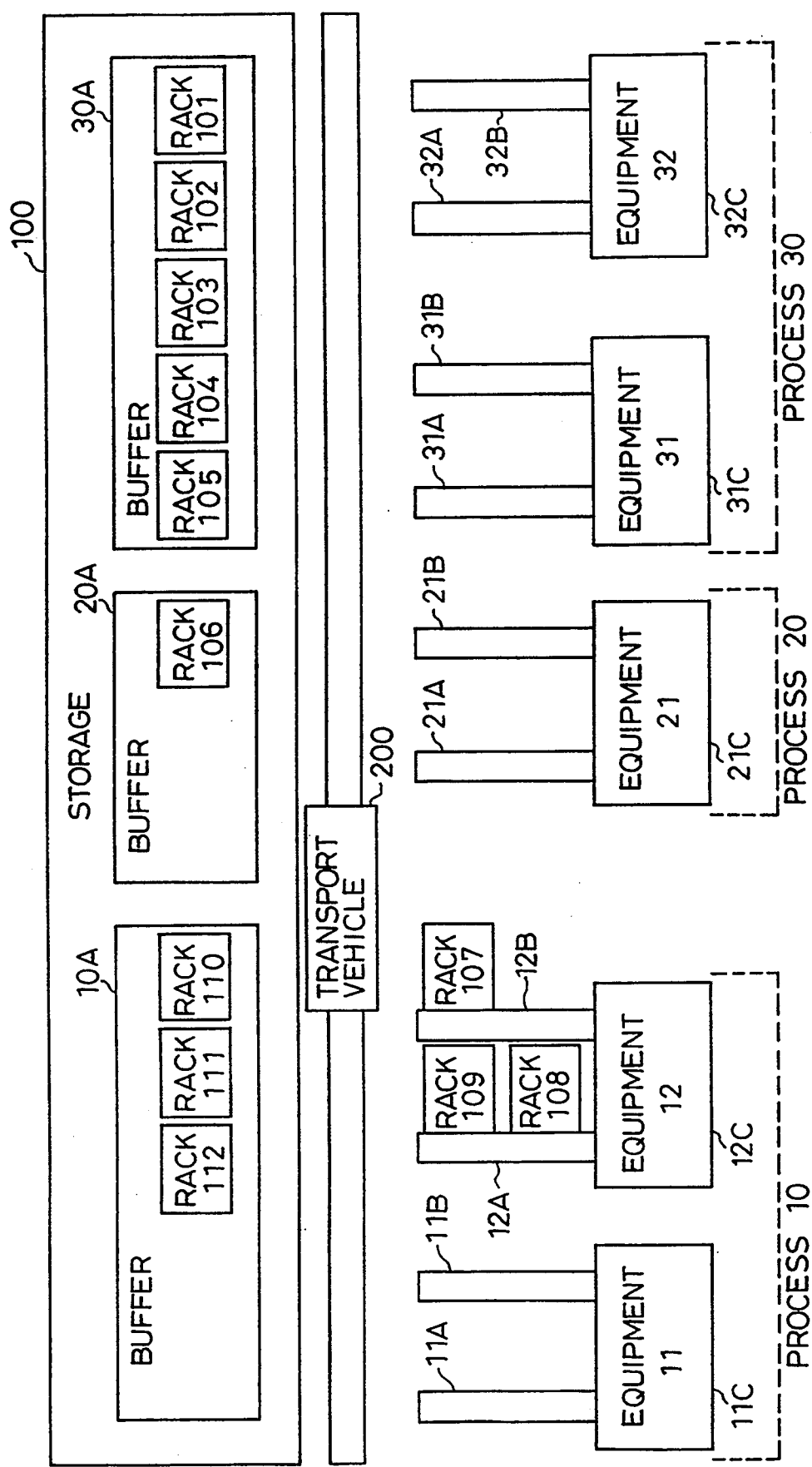
FIG. 7 is a diagram showing an example of placement of racks in the manufacturing line.

FIG. 7 illustrates an example of placement of racks in the manufacturing line. The arrangement of the manufacturing line is identical with that shown in FIG. 1; namely, the line comprises three processes 10, 20 and 30, five equipments 11 to 32, a storage 100 and a transport vehicle 200. A storage 100 includes buffers 10A, 20A and 30A associated with the processes 10, 20 and 30, respectively. For example, racks 101, 102, 103, 104 and 105 are kept in the buffer 30A, a rack 106 is kept in the buffer 20A, racks 107, 108 and 109 are situated in the equipment 12, and racks 110, 111 and 112 are kept in the buffer 10A. The equipments 11 to 32 each comprise an inlet side (11A to 32A), an outlet side (11B to 32B), and an equipment body (11C to 32C), which are each provided with a rack position sensor, a bar code reader, etc., as required. The bar code reader reads the bar code attached to each of the racks 101 to 112. Data detected by these sensors are supplied to a host computer (not shown) as information representing carry-in request, carry-out request, transport end, etc. The equipments 11 to 32 and the host computer constitute a network by means of, e.g., Ethernet.

FIGS. 8 to 12 respectively show an example of the carry-in request table, an example of the carry-out request table, an example of the rack process flow management table, an example of the in-storage rack table, and an example of the buffer condition management table. Referring to these figures, the operation of the request receiving means 1, request monitoring means 6, and transport end receiving means 8, shown in FIG. 2, will be described in detail.

The request receiving means 1 receives a carry-in request from, e.g., the equipments 11, 21, 31 and 32, and records the requests in the carry-in request table 2A, as shown in FIG. 8. Also, the means 1 receives a carry-out request from, e.g., the equipment 12, and records the request in the carry-out request table 3A, as shown in FIG. 9.

Figure 9:
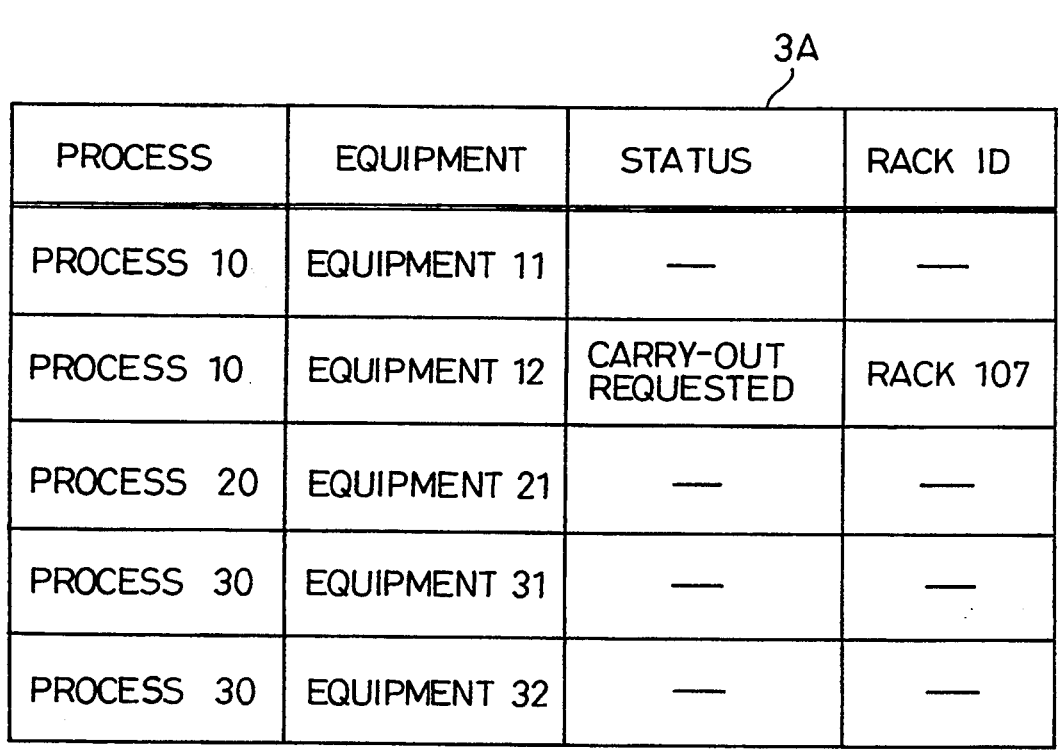
FIG. 9 is a diagram showing an example of a carry-out request table.

The request monitoring means 6 first checks the carry-out request table 3A shown in FIG. 9, and after detecting the carry-out request for the rack 107, refers to the rack process flow management table 4A, shown in FIG. 10, and determines that the next process for the rack 107 is the process 20. The means 6 then checks the carry-in request table 2A of FIG. 8 to see if a carry-in request has been received from the next process 20. In the illustrated example, a carry-in request has been received from the process 20, and accordingly, the means 6 refers to the rack process flow management table 4A of FIG. 10 and determines that the second next process for the rack 107 is the process 30. Then, the request monitoring means 6 finds the number of racks presently kept in the buffer corresponding to the second next process 30, and the upper limit number of racks that can be kept in this buffer, by referring to the in-storage rack table 5A of FIG. 11 and the buffer condition management table 7A of FIG. 12, respectively. The five racks 101 to 105 are presently kept in the buffer 30A corresponding to the second next process 30. Since the limit number of racks of the buffer 30A is "5," the rack 107 is not transported directly to the equipment 21 corresponding to the next process 20, but is temporarily kept in the buffer 20A of the storage 100.

Subsequently, the request monitoring means 6 checks the carry-in request table 2A of FIG. 8, and on detecting the carry-in request from the equipment 11 of the process 10, selects the rack 110 whose carry-in time is the oldest among the racks kept in the buffer 10A corresponding to the process 10, based on the in-storage rack table 5A of FIG. 11. Then, from the rack process flow management table 4A of FIG. 10, the means 6 recognizes that the process subsequent to the process 10, i.e., the second next process, for the selected rack 110 is the process 30. The monitoring means 6 then finds the number of racks presently kept in the buffer corresponding to the second next process 30, and the upper limit number of racks that can be kept in this buffer, by referring to the in-storage rack table 5A of FIG. 11 and the buffer condition management table 7A of FIG. 12, respectively. The number of the racks presently kept in the buffer associated with the second next process is "5" and the limit number also is "5." Thus, the rack 110 should not be transported to the equipment 11.

Thereupon, the rack 111 whose carry-in time is the oldest but the rack 110 is selected from the in-storage rack table 5A of FIG. 11. In the case of the rack 111, the second next process is the process 20. Since the number of racks presently kept in the buffer 20A associated with the process 20 is "1" and the limit number of the buffer 20A is "3" the rack 111 is transported from the buffer 10A to the equipment 11 from which the carry-in request has been received.

Upon receiving from the transport vehicle control unit 9 a transport end message indicating that the rack 107 has been transported from the equipment 12 to the buffer 20A of the storage 100, the transport end receiving means 8 initializes the corresponding record in the carry-out request table 3A, and adds a record of the rack 107 in the in-storage rack table 5A. When a transport end message indicating that the rack 111 has been transported from the buffer 10A of the storage 100 to the equipment 11 is received, the transport end receiving means 8 initializes the corresponding record in the carry-in request table 2A, and deletes the record of the rack 111 from the in-storage rack table 5A.

As described above, when any one of the racks 101 to 112 is to be conveyed to the subsequent process, it is determined whether the number of racks kept in the buffer corresponding to the second next process has reached the limit number, and only when the number of racks kept in the buffer corresponding to the second next process is smaller than the limit number, a transport command is output to transport the rack concerned to the subsequent process. Thus, the numbers of semimanufactured articles stagnating between processes can be restricted to respective suitable numbers according to the processes.

Accordingly, even in the case where the time period between the end of a process arid the start of the subsequent process is limited, such limitation can be coped with by suitably setting the limit numbers, and a situation where a large number of defective articles are output can be avoided. When the present invention is applied to a system wherein the total time required for passage through the manufacturing line is estimated by means of simulation and semimanufactured articles are introduced into the inlet of the line only when it is ascertained that the estimated time is within a predetermined time, the numbers of semimanufactured articles stagnating between respective processes can be controlled to suitable numbers even if trouble occurs in any of the processes and thus the processes are not executed in the simulated manner, whereby the disadvantage that a large number of semimanufactured articles are kept in the buffers can be prevented.

Although In the above embodiment, the transport control is carried out on racks, it may be applied to other units of transportation, such as pallets or the like.

The foregoing Is considered as illustrative only of the principles or the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. An apparatus for controlling transport of racks in a manufacturing line which includes a series of processes and has buffers associated with the respective processes for temporarily keeping racks carrying semimanufactured articles to be transported to the respective processes, the apparatus comprising:
   a host computer having a memory, and being in communication with the processes and with the buffers;
   a carry-out request table stored in said memory for recording rack carry-out requests from the processes; and
   said host computer including request monitoring means for monitoring the carry-out request table, the request monitoring means operating in response to detection of a carry-out request to output a transport command to transport a rack corresponding to the carry-out request to a next process only when the number of racks kept in buffer associated with a second next process of said rack is smaller than a predetermined value.

2. The apparatus according to claim 1, further comprising a rack process flow management table stored in said memory for managing process flows along which individual racks are to be passed, wherein the request monitoring means finds the next process and the second next process of the rack corresponding to the carry-out request, by referring to the rack process flow management table.

3. The apparatus according to claim 1, further comprising a storage containing the buffers, and an in-storage rack table stored in said memory for managing a storage state of racks kept in the individual buffers of the storage, wherein the request monitoring means finds the number of racks kept in the buffer associated with the second next process by referring to the in-storage rack table.

4. The apparatus according to claim 3, further comprising means for detecting completion of transport of the rack according to the transport command and for outputting a transport end message indicating completion of transport of the rack; and wherein said host computer further comprises transport end receiving means for receiving said transport end message when the transport of the rack according to the transport command is completed and for updating the carry-out request table and the in-storage rack table.

5. The apparatus according to claim 1, further comprising a buffer condition management table stored in said memory for storing limit numbers equivalent to upper limit numbers of racks that can be kept in the respective buffers, wherein the request monitoring means determines the predetermined value by referring to the limit numbers stored in the buffer condition management table.

6. The apparatus according to claim 1, wherein said host computer further comprises request receiving means for receiving carry-out requests from the processes and for recording the received requests in the carry-out request table.

7. An apparatus for controlling transport of racks in a manufacturing line which includes a series of processes and has buffers associated with the respective processes for temporarily keeping racks carrying semimanufactured articles to be transported to the respective processes, the apparatus comprising:
   a host computer having a memory, and being in communication with the processes and with the buffers;
   a carry-in request table stored in said memory for recording rack carry-in requests from the processes; and
   said host computer including request monitoring means for monitoring the carry-in request table, the request monitoring means operating in response to detection of a carry-in request to select a rack to be carried out of the buffer associated with the process from which the carry-in request has been output, and outputs a transport command to transport the selected rack to said process from which the carry-in request has been output only when the number of racks kept in a buffer associated with a process subsequent to said process from which the carry-in request has been output is smaller than a predetermined value.

8. The apparatus according to claim 7, further comprising a rack process flow management table stored in said memory for managing process flows along which individual racks are to be passed, wherein the request monitoring means finds the process for the selected rack subsequent to said process from which the carry-in request has been output, by referring to the rack process flow management table.

9. The apparatus according to claim 7, further comprising a storage containing the buffers, and an in-storage rack table stored in said memory for managing a storage state of racks kept in the individual buffers of the storage, wherein the request monitoring means finds the number of racks kept in the buffer associated with the process subsequent to said process from which the carry-in request has been output by referring to the in-storage rack table.

10. The apparatus according to claim 9, further comprising means for detecting completion of transport of the rack according to the transport command and for outputting a transport end message indicating completion of transport of the rack; and wherein said host computer further comprises transport end receiving means for receiving said transport end message when the transport of the rack according to the transport command is completed and for updating the carry-in request table and the in-storage rack table.

11. The apparatus according to claim 7, further comprising a buffer condition management table stored in said memory for storing limit numbers equivalent to upper limit numbers of racks that can be kept in the respective buffers, wherein the request monitoring means determines the predetermined value by referring to the limit numbers stored in the buffer condition management table.

12. The apparatus according to claim 7, wherein said host computer further comprises request receiving means for receiving carry-in requests from the processes and for recording the received requests in the carry-in request table.

* * * * *